Patented Aug. 13, 1929.

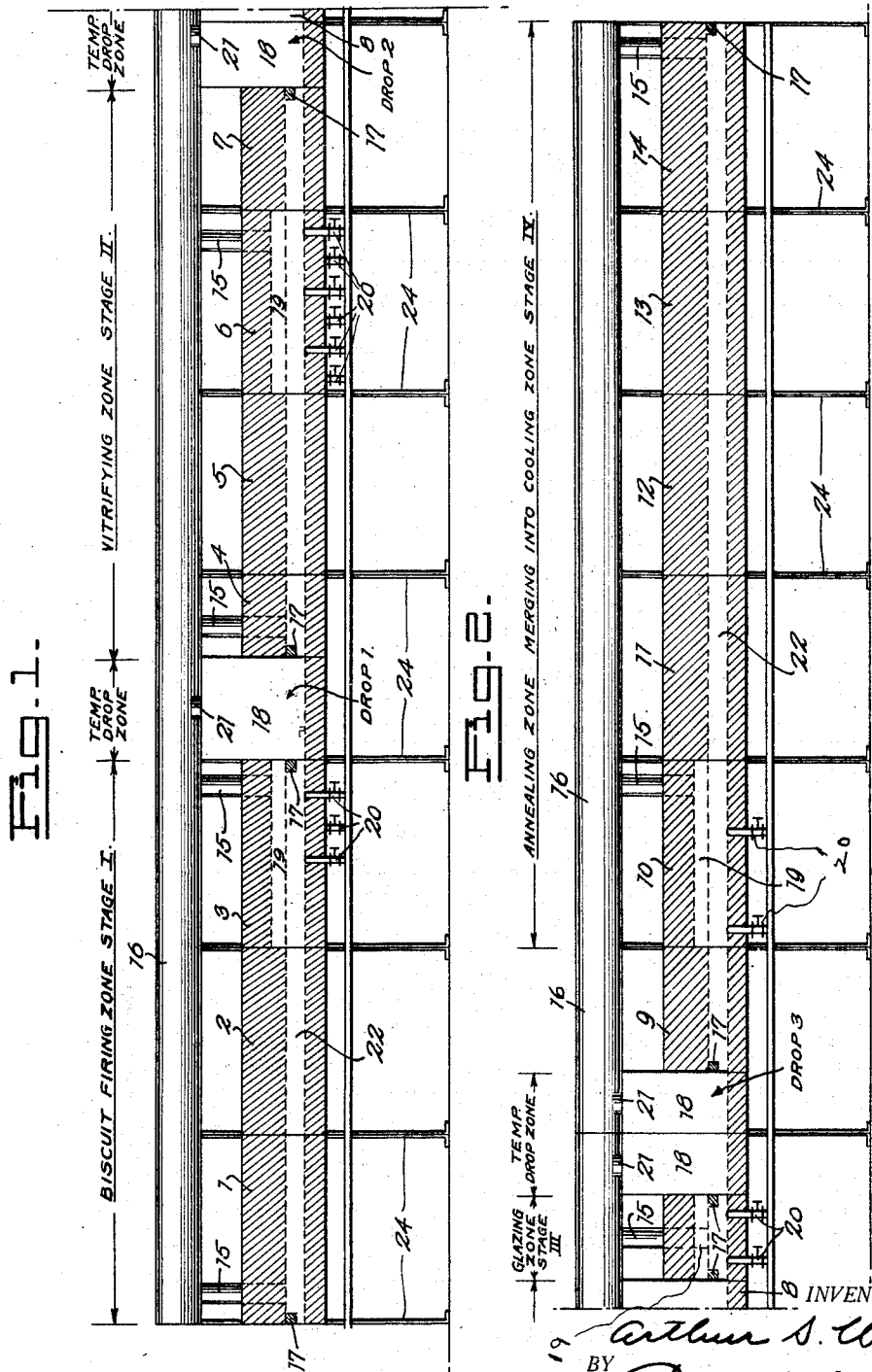

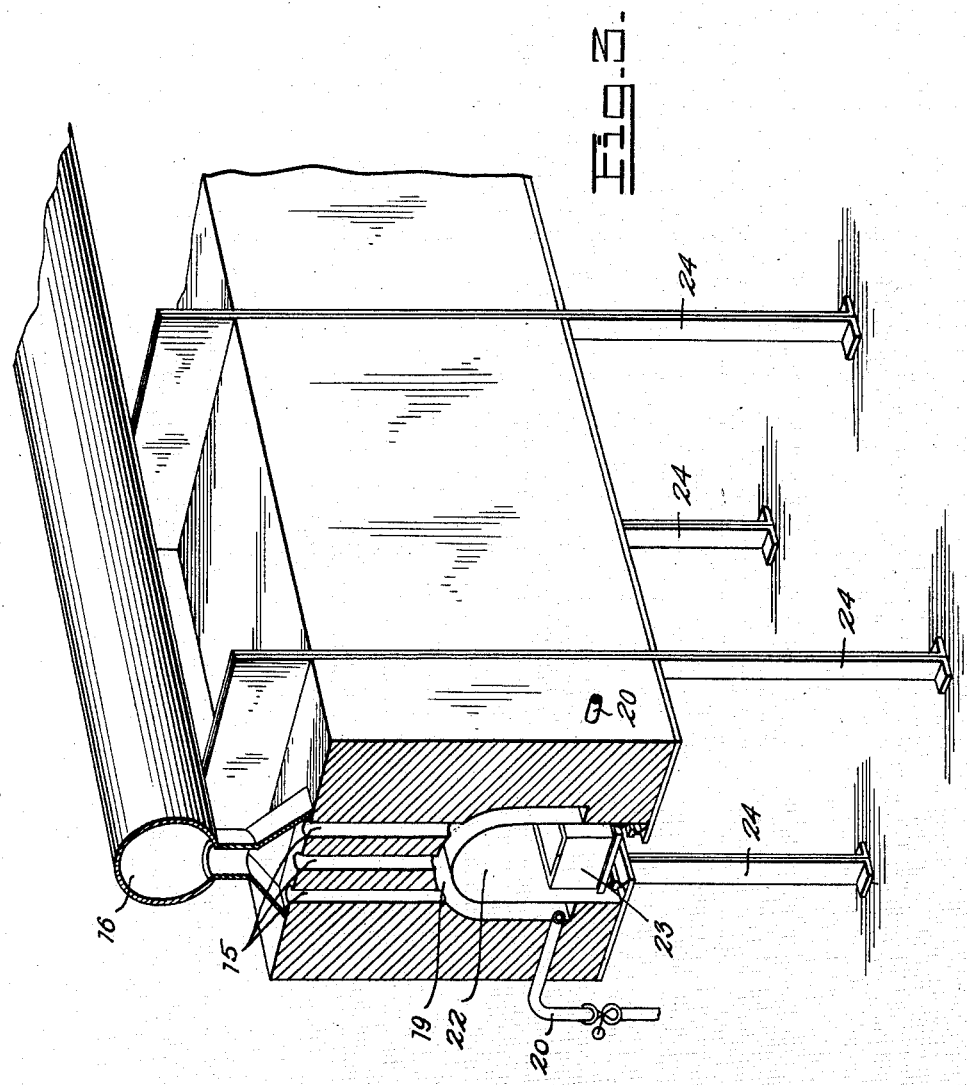

1,724,238

UNITED STATES PATENT OFFICE.

ARTHUR S. WATTS, OF COLUMBUS, OHIO.

PROCESS OF AND APPARATUS FOR FIRING CERAMIC WARE.

Application filed January 29, 1927, Serial No. 164,557. Renewed November 8, 1928.

My process of firing ceramic wares in a continuous tunnel kiln consists, broadly stated, in subjecting the ware to the stages of biscuiting, vitrifying, glazing and annealing, and also subjecting the ware to a temperature drop between any or all of said stages.

My improved continuous tunnel kiln consists, broadly stated, of distinct zones for the various stages of biscuiting, vitrifying, glazing and annealing, and a temperature drop zone between any or all of said zones, whereby any or all stages of the firing treatment may be accomplished independent of the heat action of the preceding and succeeding stages. Merely for the purpose of illustrating my invention I have shown a kiln more especially adapted for treating dental porcelain.

In the drawings:

Figure 1 is a vertical central section through a portion of a kiln embodying my invention.

Figure 2 is a similar view of the remaining portion of the kiln.

Figure 3 is a perspective view of one of the sections partly shown in section.

In the embodiment illustrating my improved kiln I have shown it as consisting of fourteen sections numbered 1 to 14, inclusive, but as hereinafter pointed out the number of sections to the kiln may be more or less to adapt it to the heat treatment of the particular ware being fired.

The sections 1, 3, 4, 6, 8, 10 and 14 have ventilating flues 15 which lead in a common flue 16. The sections 1, 3, 4, 7, 8, 9 and 14 are each provided with baffles 17, the function of each is to control the radiation and circulation from the tunnel portions of the kiln to the temperature drop chambers 18. The sections 3, 6, 8 and 10 each have muffles 19, the construction of which is more clearly shown in Figure 3. 20 are burners for said muffles.

It will be noted that the temperature drop chambers 18 are provided with vents 21 communicating with the flue 16.

The tunnel 22 of the kiln is provided with suitable tracks upon which a car 23 is mounted, said car being adapted to receive the ware and to propel the ware through the length of the kiln.

As stated, the kiln is composed of a plurality of detachable sections; each section is supported by suitable frame work mounted on the standards 24, and between the abutting ends of adjacent sections a suitable interlocking joint is formed to reduce to a minimum radiation of heat at such joints.

There are certain apparent advantages to be gained by the cooling of many ceramic wares between the stages of (1) biscuiting firing and vitrifying firing; and, (2) between the vitrification firing and glaze firing; and, (3) between glaze firing and annealing. A dropping temperature after the biscuiting firing causes a shrinkage in the body of the ware, thus aiding in the elimination of any volatile material trapped in the body through the contraction of the minute pores contained in the body, as it is manufactured. The drop between vitrification and glazing is valuable because by cooling the body to a reasonable degree the mass would be retarded as regards heat penetration when exposed to the extremely high temperature of the glazing stage of burning and would be prevented from the overfiring which would result from the abrupt passage of the ware from the vitrifying zone to the glazing zone. The drop in temperature between the glazing zone and the annealing zone is valuable in that it reduces the temperature of the ware in order to halt the pyro-chemical process connected with the maturing of the glaze, and thus produce a smoother and more satisfactory product, at the same time shortening the space necessary to come into the annealing zone from the glazing zone. This drop must not be so great or abrupt as to injure the product, due to the shock of temperature change.

In a normal tunnel kiln firing process employed in the ceramic industry, the ware is subjected to a gradual temperature increase from the entrance to the kiln to the exit from the zone of maximum temperature. This zone of maximum temperature is usually located at about the center of the kiln, the passage of the ware from the maximum temperature zone to the exit being employed as a cooling zone in which the ware gradually radiates its heat so that it emerges from the kiln at a temperature at which its exposure to the outside air will not result in injury.

Without intending to limit this invention as to when and how the glaze is applied, it may be accomplished in a number of ways for example, first: after the body of ware is fired to the desired degree of maturity, then cooled, and the glaze applied as a coating; second: after the body of the ware is subjected to a sufficient heat treatment to expel organic matter and combined moisture present in the body, and then cooled, the glaze may be applied as a thin coating; third: after the body is merely dried to eliminate water used in preparing and forming the same the glaze may be applied.

The normal ceramic ware contains a certain amount of organic matter and moisture which are volatilized in the earliest stages of firing and in the normal tunnel kiln, these volatilized products bathe the ware as it approaches the temperature zone at which volatilization occurs and thus retards the free expulsion of the gases generated in the ware during the progressive heating up of the ware. While it causes a certain contraction of the bulk volume, it also causes an expansion of the gases present in the ware, and there is no particular encouragement for these gases to completely escape since no direct suction is provided to urge their removal. According to my invention, the cooling of the ware is provided after it has passed this stage in which the organic matter and moisture are volatilized and before it reaches the stage where vitrification begins, and the contraction of the ware due to the temperature drop will expel a large portion of this entrapped volatile matter.

If the ware, after passing the maximum temperature zone provided for its vitrification, passes into a zone in which no provision is made for an abrupt temperature drop, the radiation of heat from the surface on which the ware rests will be sufficient to overcome the slight radiation from the ware itself, and the heat action within the body of the ware will continue for an indefinite stage, depending on the rate at which the temperature of the ware lowers, resulting in an overburning of the ware due to the excessive time for which it has been exposed to a temperature at which the vitrifying action takes place.

If the vitrifying zone merges directly into the glazing zone, the temperature of the glazing zone is directly additive to the temperature of the vitrifying zone, and the penetration of heat into the body caused by the heat applied for the maturing of the glaze may cause an overburning of the body if the temperature required for the maturing of the glaze is sufficiently in excess of the temperature required for the vitrification of the body. Therefore, it is proposed by my invention to—first, halt the temperature increase after the biscuit stage in order to expel the volatilized hydro-carbons and moisture. Second, to halt the temperature increase and provide a temperature drop after the vitrifying zone has been passed so that the interior of the ware may be sufficiently cooled to retard the penetration of heat to which the ware is exposed in the glazing process beyond the surface of the ware, and thus prevent an overburning of the interior of the ware. Third, to provide an abrupt temperature drop after the limited high temperature exposure in the glazing zone so that the heat which penetrates the surface of the ware in the maturing of the glaze shall have an opportunity to radiate instead of soaking into the body of the ware.

Supplemental to the burning treatment ordinarily provided and to this special high temperature glazing treatment it is proposed to introduce a moderate temperature annealing zone in which the ware will be held at a suitable temperature for a sufficient length of time to insure the gradual radiation of heat within the mass and allow the cooling treatment to progress without the development of strains due to a wide variation in the temperature of the interior and the surface portions of the ware.

Provisions may be made for the introduction of free air either cold or heated into or around the temperature drop chambers if the particular case requires.

The approximate length of temperature drops in the temperature drop zones will depend upon the purpose of the drop, the size of ware and composition of the body and the glaze. The temperature drop at the end of the biscuiting stage may be sufficient to cause practically a complete contraction of the ware to its cold size, thereby encouraging expulsion of gases existing in the ware through the oxidation of matter present when it entered the furnace. (50° to 400° C. more or less.) The temperature drop at the end of the vitrifying zone shall be sufficient to prevent the heat introduced in the glazing zone from elevating the temperature of the interior of the ware beyond the temperature attained in the vitrifying zone. (50° to 400° C. more or less.) The temperature drop at the end of the glazing zone shall be sufficient to cause the glaze to harden and prevent injury due to the absorption of gases or other phenomena which might injure its surface texture during the annealing process and also be sufficient to insure against injury to the body by over heating due to the soaking into the body of the heat introduced in the glazing zone. (50° or 400° C. more or less.)

Baffles shall be provided, if necessary, to control the radiation and circulation from the tunnel portions of the furnace to the temperature drop chambers. It will be noted that this kiln is built in sections whereby any zone of the kiln may be changed as regards length by the introduction or removal of a section or more, of the standard unit construction. This adjustable feature is provided in order that the rise in temperature or the drop in temperature most adaptable to the heat treatment of the particular ware being fired may be successfully met.

A suitable insulation of the joints between the sections is provided in order to prevent excessive heat loss where the sections are attached.

My idea is to divide the firing treatment into independent stages of conduct. However, in a continuous kiln through which the ware travels, I propose to, if necessary, halt the heat treatment at various stages of the firing process resulting in a lowering of the temperature of the ware being burned and incidently causing slight contraction of the body which will result in slower penetration of heat into the body when it enters a succeeding heated zone than if it had been carried abruptly from one hot zone to a second hot zone, the latter being maintained at a higher temperature than the former, or if the ware is carried from a high temperature zone abruptly into another heated zone of slightly lower temperature the soaking action of the heat absorbed in the higher temperature zone will be prevented from continuing to act upon the ware in the slightly lower temperature zone.

What I claim is:

1. The process of firing ceramic wares in a continuous tunnel kiln which consists in subjecting the ware to the stages of biscuiting, vitrifying, glazing and annealing, and subjecting the ware to a temperature drop between each of the said stages.

2. The process of firing ceramic wares in a single kiln, which consists in subjecting the ware to the stages of biscuiting, vitrifying, glazing, and annealing, and also subjecting the ware between some of the stages to a temperature drop.

3. The process of firing ceramic wares in a single kiln which consists in subjecting the ware to the stages of biscuiting, vitrifying, glazing, and annealing, and definitely halting the heat treatment at various stages of the firing process whereby certain physical reactions may be halted including a lowering of the temperature of the body and incidentally a slight contraction of the body, so that the penetration of heat in the succeeding zone may be a process independent of the other heat treatment.

4. That step in the continuous process of firing ceramic ware in a single kiln, which consists in a temperature drop after the biscuit firing to cause a shrinkage in the ware, thereby aiding in the elimination of any volatile material entrapped in the ware through the contraction of the minute pores contained in the ware, as it is manufactured.

5. That step in the continuous process of firing ceramic ware in a single kiln, which consists in subjecting the ware to a temperature drop between the glazing and annealing zones, whereby the temperature of the ware is reduced to halt the pyro-chemical process connected with the maturing of the glaze and thus produce a smoother and more satisfactory product, and at the same time shortening the distance travelled by the ware to come into the annealing zone from the glazing zone.

6. That step in the continuous process of firing ceramic ware, in a single kiln, which consists in subjecting the ware to a temperature drop between the vitrifying and glazing zones, to retard heat penetration in the ware when it is exposed to the temperature of glazing and prevent overfiring.

7. That step in the process of firing ceramic ware in a continuous kiln built in sections, which consists in controlling the heat treatment in the different zones by changing the length of the various zones through the introduction or removal of a section, or sections.

8. In a continuous tunnel kiln for firing ceramic ware distinct zones for the various stages of biscuiting, vitrifying, glazing, and annealing, and a temperature drop zone between each of said zones, whereby each stage of the firing treatment may be accomplished independent of the heat action of the preceding and succeeding stages.

9. In a continuous tunnel kiln for firing ceramic ware distinct zones for the various stages of biscuiting, vitrifying, glazing, and annealing, and a temperature drop zone between each of said zones, whereby each stage of the firing treatment may be accomplished independent of the heat action of the preceding and succeeding stages, and baffles in the kiln to control the radiation and circulation from the tunnel portions of the furnace to the temperature drop chambers.

10. A continuous tunnel kiln comprising a plurality of sections detachably secured together, temperature drop chambers in some of said sections, muffles in some of said sections, and ventilators leading from some of said sections.

11. A continuous tunnel kiln comprising a plurality of sections detachably secured together, temperature drop chambers in some of said sections, muffles in some of said sections, and ventilators leading from some of said sections, and a single flue common to said ventilators.

In testimony whereof I affix my signature.

ARTHUR S. WATTS.